May 2, 1961  R. A. MAYNE  2,982,468
BLOWER WHEEL AND METHOD OF MAKING SAME
Filed Oct. 31, 1955  4 Sheets-Sheet 1

INVENTOR.
ROBERT A. MAYNE
BY
HIS ATTORNEYS

May 2, 1961   R. A. MAYNE   2,982,468
BLOWER WHEEL AND METHOD OF MAKING SAME
Filed Oct. 31, 1955   4 Sheets-Sheet 2

INVENTOR.
ROBERT A. MAYNE
BY
HIS ATTORNEYS

May 2, 1961  R. A. MAYNE  2,982,468
BLOWER WHEEL AND METHOD OF MAKING SAME
Filed Oct. 31, 1955  4 Sheets-Sheet 3

INVENTOR.
ROBERT A. MAYNE
BY
HIS ATTORNEYS

May 2, 1961 R. A. MAYNE 2,982,468
BLOWER WHEEL AND METHOD OF MAKING SAME
Filed Oct. 31, 1955 4 Sheets-Sheet 4
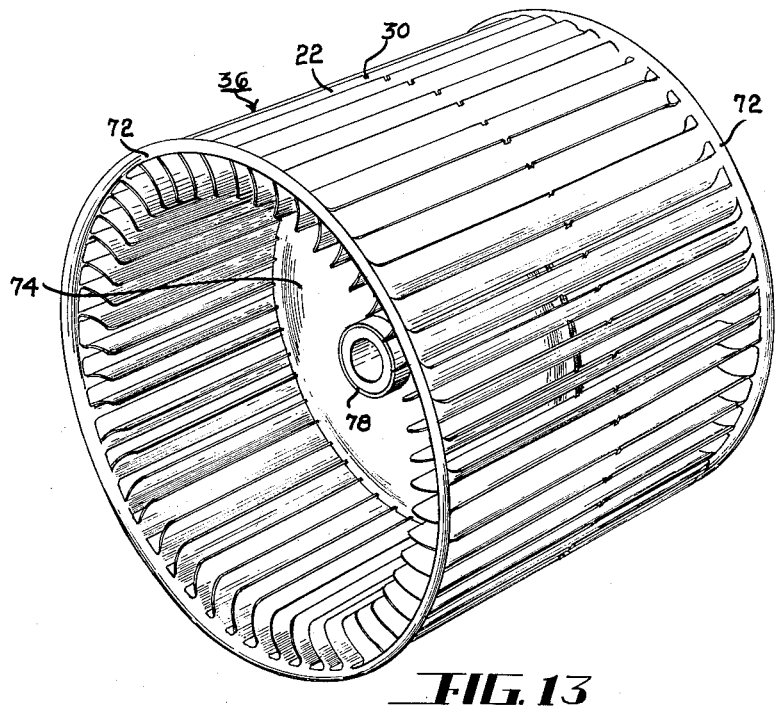
FIG. 13
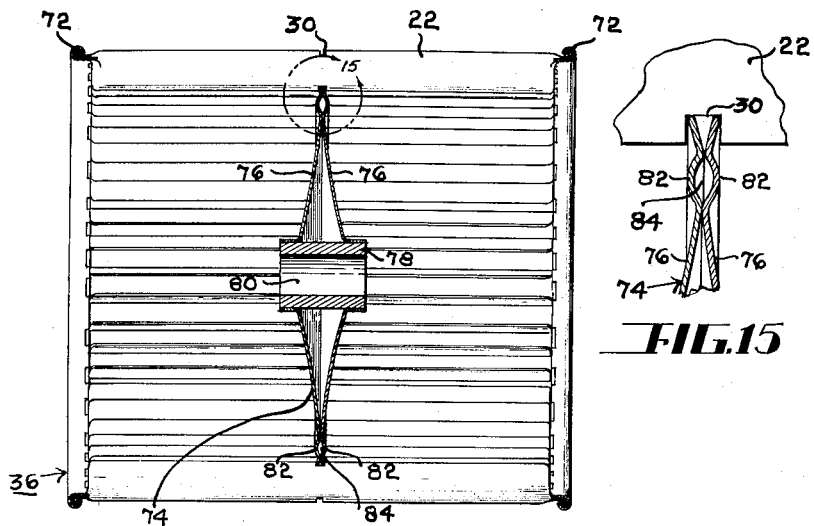
FIG. 14
FIG. 15
INVENTOR.
ROBERT A. MAYNE
BY
HIS ATTORNEYS United States Patent Office 2,982,468
Patented May 2, 1961

2,982,468

BLOWER WHEEL AND METHOD OF MAKING SAME

Robert A. Mayne, 42 W. Forrer Road, Dayton, Ohio; Ruth D. Mayne, executrix of said Robert A. Mayne, deceased, assignor to herself Filed Oct. 31, 1955, Ser. No. 543,867

12 Claims. (Cl. 230—134)

This invention relates to an improved blower wheel and the method of making same. The invention is not necessarily limited to this art, however, since the techniques herein disclosed are applicable to other arts.

The present invention brings about an improvement in the method of assembling the cylindrical blower wheel of the type formed with two concentric sheet metal stampings, as taught by Mayne et al. in United States Letters Patent No. 2,431,647, issued November 25, 1947.

An object of this invention is the provision of a blower wheel which is assembled from a minimum number of parts and which, while simplified in construction, operates with high efficiency.

Another object of this invention is to provide a pair of blade-containing stampings which can be superimposed and interlocked in a self-aligning position to form the louvered portion of a blower wheel.

Another object of this invention is to provide a method of shaping the interlocked stampings into a cylindrical drum.

Another object of this invention is to provide a method for beading the marginal portions of the drum-shaped stampings, so as to increase the rigidity of the blower wheel.

A further object of this invention is to provide a method whereby a spider member may be secured to the blower wheel.

Other objects and advantages reside in the construction of parts, the combination thereof and the mode of operation, as will become more apparent from the following description.

In the drawings,

Figure 13 is a perspective view in slightly reduced scale of the cylindrical wheel showing a spider member engaged therewith.

Figure 14 is a sectional side elevational view of the cylindrical wheel and spider member.

Figure 15 is an enlarged view of the area bounded by the line 15 in Figure 14.

Figure 1:
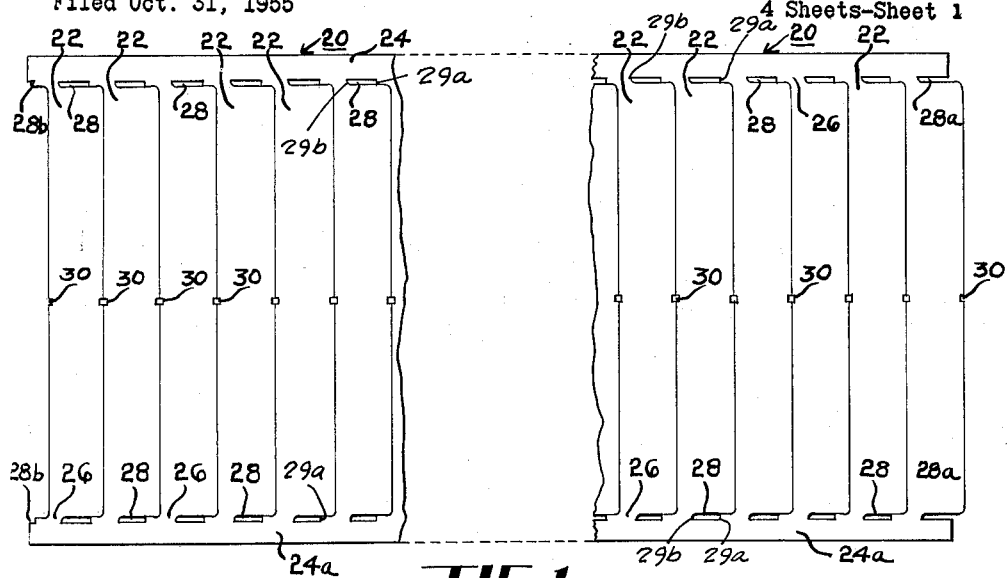
Figure 1 is a top plan view of a die cut metal sheet with the central portion broken away.

Referring to the drawings in detail, Figure 1 shows a die cut metal sheet or blade-containing member 20, which is to be shaped by stamping and then combined with a like sheet to form the blower wheel of this invention. The sheet 20 comprises a plurality of blades 22 which are held in fixed spaced relationship by marginal portions 24, there being one marginal portion 24 joining one end of all the blades 22 and another marginal portion 24a joining the other end of all the blades 22.

At each end of each blade 22 is a neck portion 26 connecting the blade to one of the marginal portions 24. Adjacent each neck portion 26 is an elongate slot 28 separating the blade 22 from the adjacent marginal portion 24. The length of the elongate slots 28 is substantially one-half the distance between blades, which, in this case, is one-half the width of each blade, 22. If the width of the blades is reduced by removing some of the metal along the margins of the blades, the length of the slot would then be greater than one-half the width of each blade.

It will be noted that at one end of the sheet 20, the right end as viewed in Figure 1, slots labeled 28a adjacent the last blade 22 in the sheet are open. On the opposite end of the sheet 20 there is a notch 28b on the inner edge of each marginal portion 24. The notches 28b complement the open slots 28a on the opposite end. Thus, if the sheet 20 were bent into cylindrical shape so that the opposite ends of the marginal portions 24 and 24a were united, the open slots 28a would cooperate with the notches 28b to form complete slots 28. The cylindrical wheel thus formed would comprise a plurality of blades 22 symmetrically arranged.

Midway between the ends of each blade 22 is a pair of notches 30, there being one notch 30 on the inner margin of each blade 22. Each of the notches 28 is provided with a pair of shoulders 29a and 29b. The shoulder 29a is located in spaced relation to the adjacent blades of the same sheet. The opposite ends of the notches form abutment shoulders 29b on the neck 26 of the blades 22. The shoulders 29a of one sheet abut the shoulders 29b of the other sheet and vice versa. The distance between adjacent shoulders 29a and 29b is equal to the spacing of the blades when the two sheets are assembled. For convenience, the notches 30 have been given the shape of half squares. However, the notches 30 may have any other suitable shape. In the application to be described, notches are required only in the inwardly directed edge of each blade. The notches formed in the outer peripheral edge of each blade result from the type of tool used in forming the notches. If the punch used to form the notches were positioned entirely within one blade member at the inwardly directed margin thereof, the notch in the outer peripheral edge of each blade would be eliminated.

Figure 2:
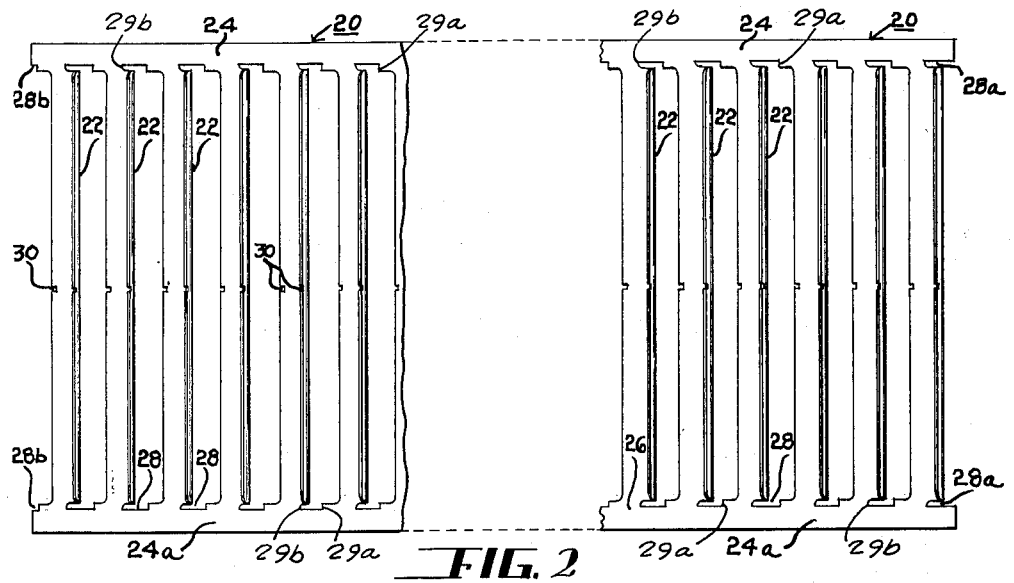
Figure 2 is a top plan view of the metal sheet after a stamping operation.
Figure 3:
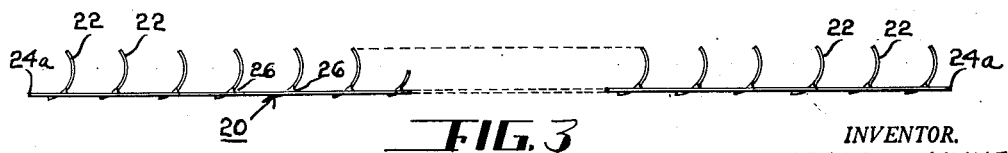
Figure 3 is a side elevational view of the sheet metal stamping.

In the fabrication of the blower wheel of this invention, the sheet 20 is first punched to form the notches 30, then stamped to shape the blades 22. In the stamping operation, the blades 22 are struck out from the plane of the sheet 20 and at the same time bent into an arcuate shape as illustrated in Figures 2 and 3. These steps may be produced by means of a progressive die.

During the stamping operation, the neck portions 26 at the ends of each blade 22 are twisted slightly out of the plane of the sheet 20. The twist in the neck portion 26 is best seen in Figure 3.

Figure 4:
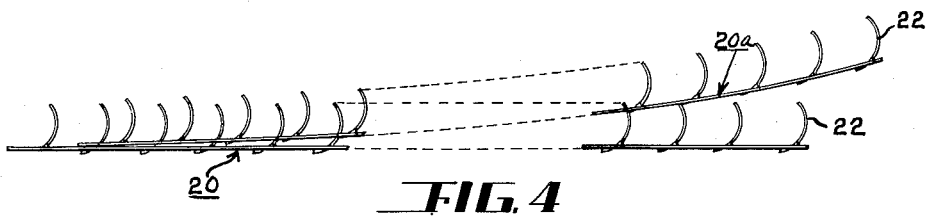
Figure 4 is a side elevational view of two similar sheet metal stampings partly superimposed.

Following the stamping operation, two stamped sheets 20 and 20a are superimposed, as shown in Figure 4. For simplicity, these sheets are originally identical, the sheet labeled 20 being the bottom sheet and the sheet labeled 20a being the top sheet. As the sheets are superimposed, the blades 22 in each sheet intermesh. For purposes to be discussed later, the intermeshed blades are staggered, so that the first blade in sheet 20a meshes between the second and third blades in sheet 20, and so on. As a result, an odd blade appears at both ends of the intermeshed combination.

Figure 5:
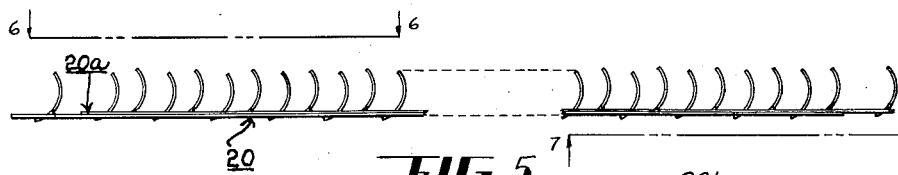
Figure 5 is a side elevational view of two similar sheet metal stampings superimposed and aligned.
Figure 6:
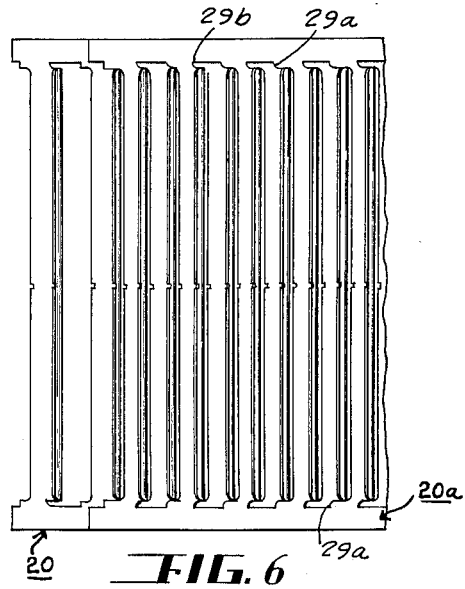
Figure 6 is a fragmentary top plan view of one end of the pair of superimposed and aligned sheet metal stampings.
Figure 7:
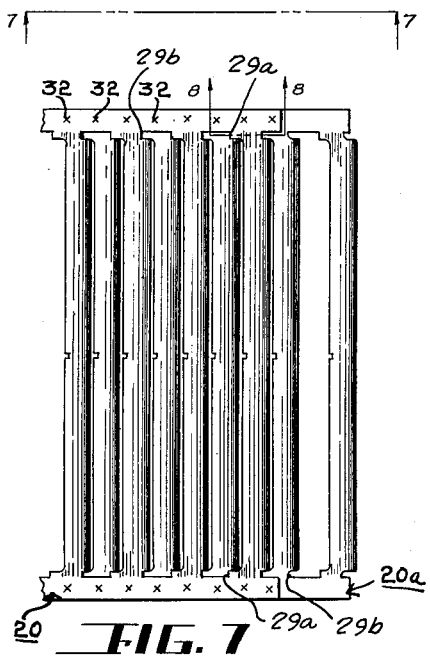
Figure 7 is a fragmentary bottom plan view of the opposite end of the superimposed and aligned sheet metal stampings showing spot welds which bind the stampings together.
Figure 8:
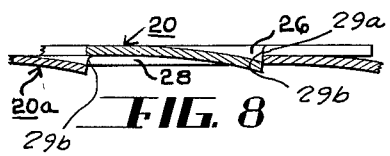
Figure 8 is a fragmentary sectional view taken substantially along the line 8—8 of Figure 7.

As seen in Figure 5, the marginal portions 24 and 24a of sheet 20 are in intimate contact with the marginal portions 24 and 24a of sheets 20a. This can happen only if the twisted neck portions 26 of sheet 20 are fitted into the corresponding slots 28 of sheet 20a. Now, if the upper sheet 20a is slid longitudinally over the lower sheet 20 until the neck portions 26 of the lower sheet 20 engage or abut the shoulders of the corresponding slots 28 in sheet 20a, the two sheets will be exactly aligned so that the blades 22 are equally spaced. Figure 8 shows in detail one neck portion 26 in sheet 20 in abutment with the end of a slot 28 in sheet 20a. This self-alignment characteristic follows from the fact that the slots 28 were given a length exactly equal to one-half the distance between blades 22. When this alignment has been made, the two sheets 20 and 20a appear as is shown in Figures 5 and 6.

The next step in the fabrication of the blower wheel of this invention is to temporarily bond the superimposed sheets 20 and 20a together. Though other suitable means may be used, spot welding is preferable for this purpose. As indicated in Figure 8, the sheets are spot welded at a plurality of places 32 along the marginal portions 24 and 24a of the sheets 20 and 20a.

Figure 9:
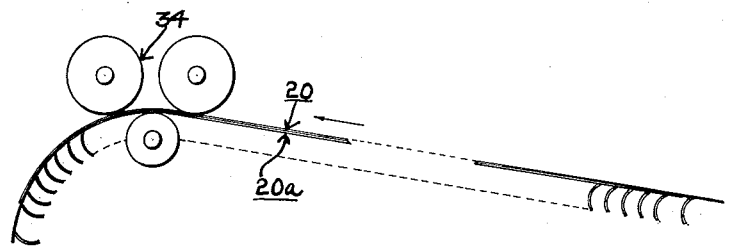
Figure 9 is a schematic view of reduced scale of an apparatus for bending the superimposed sheet metal stampings into cylindrical wheel.

The superimposed sheets 20 and 20a are next curved into a cylindrical shape by passing the marginal portions 24 and 24a through a combination of rollers 34 shown schematically in Figure 9. The exact nature of this process is inconsequential, it being significant only that some means is employed to bend the combination of sheets into approximately the shape of a cylindrical wheel. The rollers are preferably designed to deflect the outer edges of the marginal portions to provide a beveled surface.

During this bending operation, it is necessary that either the outer sheet 20 expand or the inner sheet 20a contract. Just what will happen depends somewhat upon the nature of the materials used. It is found that when sheet steel is used, the outer member 20 expands only slightly, if at all, while the marginal portions 24 of the inner sheet 20a buckle slightly between the welds 32, thus reducing the effective length of the sheet 20a.

The end portion of the inner sheet 20a which projects beyond the end of the sheet 20 is not shortened, as would be desired by the bending operation. To compensate for this, it is found expedient to clip off a short length of the marginal portions 24 and 24a of the sheet 20a at this end.

After the combined sheets 20 and 20a have been bent into substantially the shape of a cylindrical wheel, the odd blades 22 at either end of the combination of sheets are intermeshed to form a complete cylindrical wheel 36 having symmetrically arranged equally spaced blades. The ends of the marginal portions 24 and 24a of sheet 20 are then spot welded to the corresponding ends of the marginal portions 24 and 24a of sheet 20a to bind the intermeshed ends together.

Figures 10, 11:
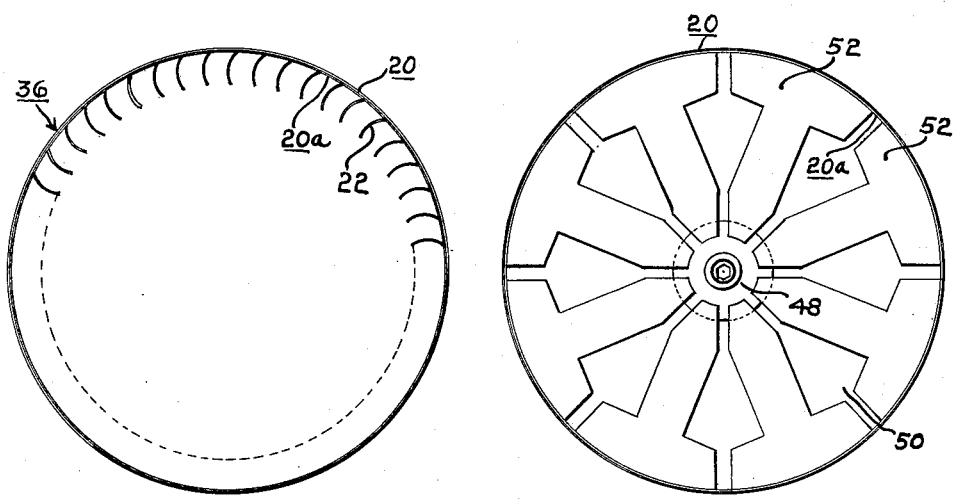
Figure 10 is a fragmentary end view of the cylindrical wheel formed from the superimposed sheet metal stampings, the view being in reduced scale.
Figure 11 is a detail view in reduced scale of an expandable segment wheel adapted to engage and support the marginal portions of the cylindrical wheel.

The wheel 36 thus formed is shown in Figure 10, which shows the blade members 22 to be inwardly directed. It is evident, however, that the sheets 20 and 20a could have been bent in the opposite sense, with the sheet 20 the innermost sheet rather than the sheet 20a. In this case, the blades 22 would be directed outwardly from the wheel 36. Whether the blades are directed inwardly or outwardly is a matter of choice, dependent upon the intended use of the final product.

The wheel 36, at this point in the assembly, is not rigid and not necessarily truly circular in cross section. In the next operation, the wheel 36 is placed in a beading machine which simultaneously beads the marginal portions 24 and 24a and forces the wheel 36 into a truly cylindrical shape. The beading machine used is the subject of my copending application entitled "Beading Machine," Serial No. 503,420, filed April 25, 1955 now matured into Patent No. 2,897,873.

Figures 12, 16:
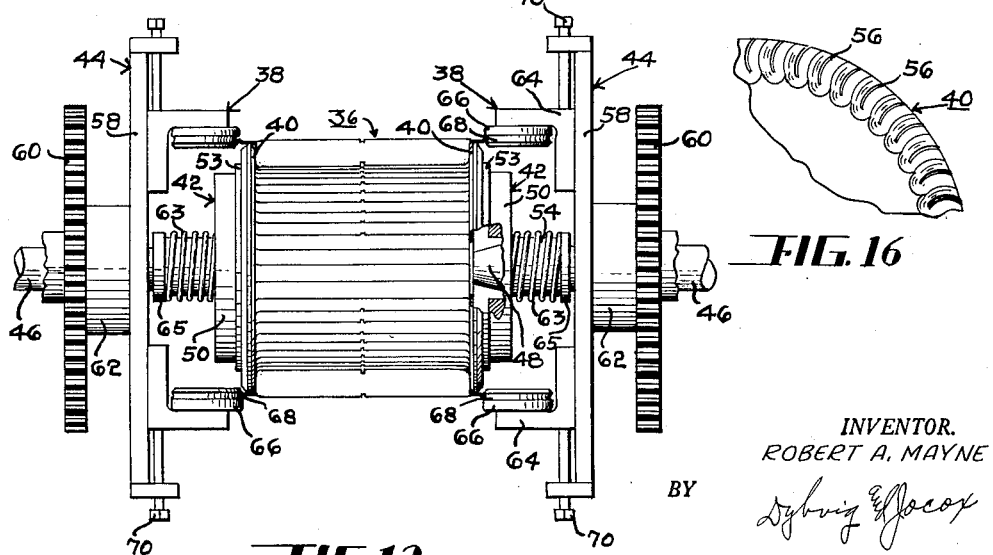
Figure 12 is a fragmentary detail view of a beading machine for beading the marginal portions of the cylindrical wheel, in reduced scale and with parts shown in section.
Figure 16 is a fragmentary plan view of an alignment plate drawn to reduced scale.

As shown in Figure 12, the beading machine comprises two substantially identical beading heads 38 mounted coaxially and in opposing position. For simplification, one beading head will be described in detail, it being understood that the other beading head is identical.

The beading head 38 has three primary functional elements, an aligning plate 40, an engagement or expansion mechanism 42, and a beading member 44. All three elements are coaxially mounted upon a non-rotatable shaft 46 having one end 48 tapered to the shape of a frustum.

The engagement mechanism 42, shown in Figure 11, includes a plate 50 which supports a plurality of radially disposed segment members 52. Integral with the plate 50 is a cylindrical boss 54 through which the shaft 46 projects to thereby support the plate 50. The cylindrical boss 54 is keyed to the shaft 46, so as to be non-rotatable; but is slidable axially along the shaft 46. The segment members 52 are adapted to move radially upon the plate 50, however, are restrained from so doing by garter springs 53 which urge the segment members 52 toward the center of the plate 50 into contact with the frustum-shaped end 48 of the shaft 46.

The outer arcuate margins of the segment members 52 define a circle, the diameter of which is dependent upon the position of the shaft 46 with respect to the plate 50. Thus, as the shaft 46 is projected into the plate 50, the frustum end 48 engages the segment members 52 pushing the segment members outwardly to increase the diameter of the circle formed thereby.

The alignment plate 40 abuts the segment members 52 and is bolted to the plate 50. A centrally located aperture (not shown) in the alignment plate 40 permits passage of the shaft 46 therethrough. Along the outer perimeter of the alignment plate is a plurality of equally spaced beveled arcuate slots 56, the number of slots 56 just equalling the number of blades 22 in the wheel 36. The shape and dimensions of these slots complement the arcuate blades 22. A fractional view of the alignment plate 42 appears in Figure 16.

The beading member 44 includes a disc 58 and a gear member 60 held in fixed spaced relationship by a cylindrical hub 62. The disc 58, gear member 60 and the hub 62 are rotatably journalled upon the shaft 46, the disc 58 and plate 50 being separated by a coil spring 63 and adjacent washer 65. On one face of the disc 58 are two or more brackets 64 disposed in diametrically opposite positions, each being equidistant from the shaft 46. Each bracket 64 supports a rotatable roller 66 which is adapted to rotate on an axis which is radial with respect to the disc 58. In the surface of each roller 66 is an annular groove 68 having a semi-circular cross section. Adjustment screws 70 permit radial adjustment of the separation between the rollers 66.

The cylindrical wheel 36 is placed in the beading machine by first placing the wheel between the opposing beading heads 38 and in substantial concentric alignment with the opposed shafts 46. By external means (not shown) the shafts 46 are moved toward one another, causing the alignment plates 40 to engage and align the blades 22 of the wheel 36. When the blades 22 securely abut the alignment plates 40, further movement of the shafts 46 toward one another will force the segment members 52 in each beading head 38 outwardly to engage the marginal portions 24 and 24a of the blower wheel 36. Considerable force is applied to the shafts 46 so as to actually expand the marginal portions 24 and 24a, thereby removing any buckling of the inner convolution that may have occurred during the earlier bending operation.

The blower wheel 36 is thus securely engaged in the beading machine and the beading operation is started. The rollers 66 of each beading member 44 are positioned so that the separation between the inner edges of the annular grooves 68 just corresponds to the inner diameter of the marginal portions 24 and 24a of the wheel 36. External means (not shown) engaging the gears 60 rotate the discs 58 causing the rollers 66 on each disc to follow one another in a circular orbit. Simultaneously, another external means drives the discs 58 toward one another, bringing the opposite pairs of rollers 66 into engagement with the beveled edges of opposite margins 24 and 24a of the blower wheel 36. Considerable force is applied, causing the marginal portions 24 and 24a to bend under the pressure of the rollers 66 and to follow the contour of the grooves 68. Thus, the marginal portions 24 and 24a are bent outwards and back upon themselves to form a bead 72, as shown in Figures 13 and 14.

In actual practice, the bead 72 is fully formed after only a small number of revolutions of the discs 58. The operation of the beading machine is smoothest if the two opposing discs 58 rotate in the same direction, so that the rollers 66 on one side exert a pressure directly opposite to the pressure of the rollers on the opposite side. Thus, the combined pressures on the two margins are directed opposite the ends of each blade simultaneously and in seriatim. The beads 72 give the blower wheel 36 enhanced rigidity and permanently bind the stamped sheets 20 and 20a together.

In the final step in the assembly of the blower wheel, a spider or center disc member 74 is secured to the wheel 36. The construction of the spider member 74 and the method of securing the wheel to the spider member is the subject of my copending application entitled "Blower Rotor and Method of Making Same," Serial No. 385,526, filed October 12, 1953.

The spider member 74 comprises two discs 76 attached to a hub 78 through which extends a boring 80. A circular protrusion 82 is formed adjacent the periphery of each of the discs or plates 76. Both of the discs or plates 76 have substantially the same diameter. When the discs 76 are assembled upon the hub 78 and attached thereto, the protrusions 82 in the discs 76 form an annular tube 84 in the spider member 74 adjacent the periphery thereof.

The spider member 74 is positioned within the cylindrical wheel 36 approximately at the longitudinal center thereof so that the outer edge of the spider member 74 is aligned with the notches 30 in the blades 22. The protrusions 82, forming the annular tube 84, are then squashed toward one another by any suitable means, so that the outside diameter of the spider member 74 increases and the circumferential edges thereof move into the notches 30. Simultaneously, the circumferential edges of the spider member 74 move apart slightly to engage the sides of the notches 30, as shown in Figure 15.

Due to the fact that two identical stamped sheets 20 and 20a were superimposed, it follows that the distance the alternate blades 22 project into the center of the wheel 36 will differ by an amount equal to one thickness of the sheet metal used to fabricate the sheets 20 and 20a. However, when the diameter of the spider member 74 is expanded, all the blades 22 are driven into circular alignment.

In some types of blower wheels it may be preferable to mount the spider member at one end of the wheel, in which case only one of the marginal portions need be beaded, the other being supported by the spider member. When it is desired to bead only one marginal portion, only one head 38 of the beading machine need be used. The other head may then be stopped from rotation and used either directly or through a block positioned between the stopped head and the blower wheel merely to support the marginal portion which is not to be beaded, or the other head may be removed from the beading machine and a suitably shaped support block substituted therefor, the support block being used to support the unbeaded end of the blower wheel.

The resultant product, depicted in Figures 13 and 14, is the blower wheel of this invention.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In a cylindrical blower wheel, a pair of substantially identical blade-containing members, each said member including a plurality of equally spaced parallel blades having neck portions at the ends thereof, a pair of opposite marginal portions engaging the neck portions, the blades extending between the marginal portions, each said marginal portion having a plurality of slots therein, there being one slot in each marginal portion intermediate each pair of adjacent blades, the slot extending from the neck portion of one blade parallel to the marginal portion for a distance equal to half the separation between blades of the same blade-containing member, the two blade-containing members being superimposed one upon the other, the blades of one member intermeshing with the blades of the other member and the slots of one member engaging the neck portions of the other member, the intermeshed blades being equally spaced when the neck portions of said other member abut the ends of the slots of the one member.

2. The method of making a blower wheel of the type having a plurality of cylindrically disposed blades held in fixed spaced relationship by marginal portions at the ends thereof, comprising the steps of cutting metal sheets so as to form in each sheet a plurality of parallel equally spaced blades held in fixed spaced relationship by normally extending marginal portions engaging the ends thereof; stamping said sheet to strike the blades out from the plane of the sheet; superimposing the two stamped sheets so that the blades in one sheet intermesh with the blades in the other sheet; aligning the intermeshed blades for proper spacing; binding the superimposed sheets together to preserve the spacing of the blades; bending the marginal portions into a hoop shape, the superimposed sheets thereby having the shape of a cylinder; binding the opposite ends of the marginal portions together; engaging and expanding the opposite marginal portions; beading simultaneously the edges of the opposite marginal portions; positioning a disc-shaped spider member in the center of said wheel, said spider member having an annular tubular protrusion adjacent the outer margins thereof, compressing the annular tubular protrusion of the spider member so as to expand the spider member into engagement with the cylindrically disposed blades.

3. In the method of making a cylindrical blower wheel of the type having a plurality of cylindrically disposed blades held in fixed spaced relationship by marginal portions engaging the ends thereof, the steps of superimposing two substantially identical blade-containing members, providing each said member with slots in the marginal portions, said slots terminating in shoulders located in spaced relation with respect to the blower blades of the same member for aligning the members one with respect to the other to equally space the blades, curving the marginal portions of said blade-containing members into a hoop shape so as to form the superimposed members into a cylindrical wheel, binding together opposite ends of the marginal portions, beading the marginal portions at at least one end of the cylindrical wheel.

4. In the method of making a cylindrical blower wheel of the type having a plurality of cylindrically disposed blades held in fixed spaced relationship by marginal portions engaging the ends thereof, the steps of forming two substantially identical blade-containing members, each said member having a plurality of parallel equally spaced blades held in fixed spaced relationship by opposite marginal portions; placing slots in the marginal portions intermediate each pair of adjacent blades, superimposing the blade-containing members in staggered relationship so that the blades in one member project into the slots in the marginal portions in the other member, the blades intermeshing in equal spaced relationship, there being at least one blade on each end of the superimposed blade members which is not intermeshed with other blades; bending the marginal portions into a hoop shape; intermeshing those blades on each end of the superimposed sheets which had not been previously intermeshed; binding together the opposite ends of the marginal portions to form thereby a cylindrical blower wheel; beading the edge of at least one marginal portion to form a continuous hollow bead along one end of the cylindrical wheel; placing centrally located notches on the inner edges of the cylindrically disposed blades; positioning in the center of the cylindrical wheel a disc-shaped spider member of the type having an annular tubular protrusion at the outer margin thereof; compressing the annular tubular protrusion of the spider member so as to expand the spider member into engagement with the notches in the blades.

5. The method of manufacture of a blower wheel of the type having two substantially identical strips of material superimposed upon each other, said strips containing a plurality of spaced parallel blades arranged in a cylindrical array and secured by opposite continuous marginal portions including the steps of simultaneously engaging and expanding the marginal portions of the blower wheel, forcing the edges of the opposite marginal portions simultaneously outwardly away from the center of the blower wheel, and rolling the opposite marginal portions simultaneously so as to form a bead.

6. In a cylindrical blower wheel a pair of substantially identical blade-containing members, each said member including a plurality of spaced parallel blades, and opposite marginal portions engaging the ends of the blades, the blades extending between the marginal portions, each said marginal portion having a plurality of slots therein, there being one slot in each marginal portion intermediate each pair of adjacent blades, each slot terminating in a shoulder located in spaced relation from the adjacent blades, the two blade-containing members being superimposed one upon the other, the blades in one member intermeshing with the blades in the other member, the shoulders of the slots in one member engaging the ends of the blades in the other member to align the intermeshed blades in proper spaced relationship.

7. In a cylindrical blower wheel, a pair of substantially identical blade-containing members, each said member including a plurality of spaced parallel blades, and opposite marginal portions engaging the ends of the blades, the blades extending between the marginal portions, the two blade-containing members being superimposed one upon the other, the blades in one member intermeshing with the blades in the other member, and means including marginal shoulders located in spaced relation with respect to the adjacent blades of the same member for aligning the intermeshed blades in proper spaced relationship.

8. A cylindrical blower wheel including a pair of superimposed blade-containing members, each member having a plurality of blades held in fixed spaced relationship by opposite marginal portions, the blades of one member intermeshing with the blades of the other member, the marginal portions of one member overlying the marginal portions of the other member, slots integral with the marginal portions, each of said slots terminating in a shoulder positioned in spaced relation with respect to the blades of the same marginal portion to align the superimposed blades one wtih respect to the other so that the intermeshed blades are equally spaced longitudinally of said blade-containing members, said overlying marginal portions having a hoop shape forming thereby a cylindrical blade-containing wheel, the marginal portions of at least one end of said wheel being beaded to form a continuous hollow bead along one end of the cylindrical wheel.

9. A cylindrical blower wheel including a pair of superimposed blade-containing members, each member having a plurality of blades held in fixed spaced relationship by opposite marginal portions, the blades of one member intermeshing with the blades of the other member, the marginal portions of one member overlying the marginal portions of the other member, slots integral with the marginal portions of at least one blade-containing member, each of said slots terminating in a shoulder positioned in spaced relation to the blades of said blade-containing member for aligning the superimposed blades one with respect to the other so that the intermeshed blades are equally spaced longitudinally of said blade-containing members, said overlying marginal portions having a hoop shape forming thereby a cylindrical blade-containing wheel, the marginal portions of at least one end of said wheel being beaded to form a continuous hollow bead along one end of the cylindrical wheel.

10. In the method of making a cylindrical blower wheel of the type having a plurality of cylindrically disposed blades held in fixed spaced relationship by marginal portions engaging the ends thereof, the steps of forming two substantially identical blade-containing members, each said member having a plurality of parallel equally spaced blades held in fixed spaced relationship by opposite marginal portions; placing slots in the marginal portions, each of said slots terminating in a shoulder intermediate each pair of adjacent blades of the same member, superimposing the blade-containing members in staggered relationship so that the blades in one member project into the slots of the other member and abut the shoulder in the marginal portions in the other member, the blades intermeshing in equal spaced relationship, there being at least one blade on each end of the superimposed blade members which is not intermeshed with other blades; bending the marginal portions into a hoop shape; intermeshing those blades on each end of the superimposed sheets which had not been previously intermeshed; binding together the opposite ends of the marginal portions to form thereby a cylindrical blower wheel; beading the edge of at least one marginal portion to form a continuous hollow bead along one end of the cylindrical wheel.

11. In a cylindrical blower wheel, a pair of substantially identical blade-containing members, each said member including a plurality of spaced parallel blades, and opposite marginal portions engaging the ends of the blades, the blades extending between the marginal portions, each said marginal portion having pairs of oppositely disposed shoulders, the distance between adjacent oppositely disposed shoulders being equal to the spacing of the blades in the blower wheel, the two blade-containing members being superimposed one upon the other, the shoulders of one of the blade-containing members engaging opposed shoulders of the other blade-containing member to space the blades in the blower wheel.

12. In a cylindrical blower wheel, two substantially equal strips of superimposed material containing equally spaced blades, the marginal portions of each strip having marginal portions holding its blades in fixed relationship, the marginal portions being secured together at spaced intervals, notches in the marginal portions of at least one strip terminating in shoulders positioned in spaced relation to the blades of the same marginal portion and abutting the blades of the other strip, the blades being disposed laterally along the periphery of the cylindrical blower wheel, there being one marginal portion at each end of the cylindrical wheel, at least one of said marginal portions being beaded to form a continuous hollow bead thereon.

References Cited in the file of this patent

UNITED STATES PATENTS

| | | |
|---|---|---|
| 620,398 | Zeh | Feb. 28, 1899 |
| 903,532 | Anderson | Nov. 10, 1908 |
| 976,353 | Gansslen | Nov. 22, 1910 |
| 978,036 | Klahn | Dec. 6, 1910 |
| 1,318,412 | Rudolphi | Oct. 14, 1919 |
| 1,365,073 | Allerton | Jan. 11, 1921 |
| 1,370,557 | Pierce | Mar. 8, 1921 |
| 1,853,881 | Rhodes | Apr. 12, 1932 |
| 2,125,697 | Swingle et al. | Aug. 2, 1938 |
| 2,240,238 | Baker | Apr. 29, 1941 |
| 2,291,480 | Marbach | July 28, 1942 |
| 2,304,581 | Lyon | Dec. 8, 1942 |
| 2,315,407 | Evans | Mar. 30, 1943 |
| 2,413,594 | White | Dec. 31, 1946 |
| 2,431,647 | Mayne et al. | Nov. 25, 1947 |
| 2,500,071 | Hans | Mar. 7, 1950 |
| 2,514,502 | Laxo | July 11, 1950 |
| 2,537,805 | Wilken | Jan. 9, 1951 |
| 2,649,243 | Stalker | Aug. 18, 1953 |